United States Patent
Ishida et al.

(10) Patent No.: US 9,308,707 B2
(45) Date of Patent: Apr. 12, 2016

(54) JOINED PRODUCT

(75) Inventors: Tomoyuki Ishida, Itami (JP); Hideki Moriguchi, Itami (JP); Takeru Nakashima, Itami (JP); Satoru Kukino, Itami (JP); Shinichiro Yurugi, Itami (JP); Teruhiro Enami, Itami (JP); Katsumi Okamura, Itami (JP); Yusuke Matsuda, Itami (JP); Koji Sano, Itami (JP); Keizo Kobayashi, Nagoya (JP); Kimihiro Ozaki, Nagoya (JP)

(73) Assignees: Sumitomo Electric Industries, Ltd., Osaka-shi (JP); Sumitomo Electric Hardmetal Corp., Itami-shi (JP); National Institute of Advanced Industrial Science and Technology, Tokyo (JP)

( * ) Notice: Subject to any disclaimer, the term of this patent is extended or adjusted under 35 U.S.C. 154(b) by 243 days.

(21) Appl. No.: 13/989,703

(22) PCT Filed: Nov. 22, 2011

(86) PCT No.: PCT/JP2011/076888
§ 371 (c)(1),
(2), (4) Date: May 24, 2013

(87) PCT Pub. No.: WO2012/070563
PCT Pub. Date: May 31, 2012

(65) Prior Publication Data
US 2013/0236240 A1 Sep. 12, 2013

(30) Foreign Application Priority Data

Nov. 26, 2010 (JP) .................................. 2010-263758

(51) Int. Cl.
*C22C 1/02* (2006.01)
*B32B 15/16* (2006.01)
(Continued)

(52) U.S. Cl.
CPC ............... *B32B 15/16* (2013.01); *B23K 1/0004* (2013.01); *B23K 1/0008* (2013.01); *B23K 1/19* (2013.01);
(Continued)

(58) Field of Classification Search
CPC ............ B23B 2222/88; B23B 2224/36; B23B 2226/125; B23B 2240/00; B23B 2240/08; B23K 20/16; B23K 2201/20; B23K 2203/18; B23K 2203/22; B23K 2203/24; B23K 35/3033; B23K 35/302; B23K 31/025; B32B 15/16; C22C 1/023
USPC ......................................... 403/270–272, 404
See application file for complete search history.

(56) References Cited

U.S. PATENT DOCUMENTS 5,712,030 A 1/1998 Goto et al.
6,155,755 A 12/2000 Kanada et al.
(Continued)

FOREIGN PATENT DOCUMENTS

CN 1137959 A 12/1996
CN 101102863 A 1/2008
(Continued)

OTHER PUBLICATIONS

"Titanium Coatings—Product Listing." Hannibal Cardbide Tool, Inc. Mar. 6, 2010, [online], [retrieved on Mar. 17, 2015]. Retrieved from the Internet <URL: https://web.archive.org/web/20100603060630*/http://www.hannibalcarbide.com/catalog.php>.*
(Continued)

*Primary Examiner* — Josh Skroupa
(74) *Attorney, Agent, or Firm* — Venable LLP; Michael A. Sartori; F. Brock Riggs

(57) ABSTRACT

A joined product has a cemented carbide sintered compact serving as a first material to be joined and a cBN sintered compact serving as a second material to be joined, wherein: the first material to be joined and the second material to be joined are joined together via a joining material disposed therebetween and containing titanium (Ti); and a titanium nitride (TiN) compound layer having a thickness of 10-300 nm is produced at an interface between the second material to be joined and the joining material.

6 Claims, 2 Drawing Sheets

(51) Int. Cl.
  B23K 1/00    (2006.01)
  B23K 1/19    (2006.01)
  B23K 20/02   (2006.01)
  B23K 20/16   (2006.01)
  B23K 20/233  (2006.01)
  B23K 31/02   (2006.01)
  B23K 35/00   (2006.01)
  B23K 35/30   (2006.01)
  C22C 9/00    (2006.01)
  C22C 9/06    (2006.01)

(52) U.S. Cl.
  CPC ......... *B23K 20/023* (2013.01); *B23K 20/16* (2013.01); *B23K 20/233* (2013.01); *B23K 31/025* (2013.01); *B23K 35/001* (2013.01); *B23K 35/302* (2013.01); *B23K 35/3033* (2013.01); *C22C 1/02* (2013.01); *C22C 1/023* (2013.01); *C22C 9/00* (2013.01); *C22C 9/06* (2013.01); *B23B 2222/88* (2013.01); *B23B 2224/36* (2013.01); *B23B 2226/125* (2013.01); *B23B 2240/08* (2013.01); *B23K 2201/20* (2013.01); *B23K 2203/18* (2013.01); *Y10T 403/479* (2015.01)

(56) References Cited

U.S. PATENT DOCUMENTS

| | | | | |
|---|---|---|---|---|
| 6,187,421 | B1 * | 2/2001 | Moriguchi | C23C 28/044 428/216 |
| 7,592,077 | B2 * | 9/2009 | Gates, Jr. | B23B 27/148 428/698 |
| 2008/0016785 | A1 | 1/2008 | Kukino et al. | |
| 2011/0020082 | A1 | 1/2011 | Ozaki et al. | |

FOREIGN PATENT DOCUMENTS

| | | | |
|---|---|---|---|
| EP | 0940215 | A1 | 9/1999 |
| JP | H07156003 | A | 6/1995 |
| JP | 11-294058 | A | 10/1999 |
| JP | 11-320218 | A | 11/1999 |
| JP | 11320218 | A * | 11/1999 |
| JP | 2002-036008 | A | 2/2002 |
| JP | 3549424 | B2 | 8/2004 |
| WO | WO-2009/123065 | A1 | 10/2009 |

OTHER PUBLICATIONS

"Titanium Coatings." Hannibal Carbide Tool, Inc. Jan. 6, 2010, [online], [retreived on Mar. 17, 2015] Retreived from the Internet <URL: https://web.archive.org/web/20100315000000*/http://www.hannibalcarbide.com/technical-support/titanium-coatings.php>.*

"Titanium Coatings—Product Listing." Hannibal Carbide Tool, Inc. Mar. 6, 2010, [online], [retreived on Mar. 17, 2015] Retreived from the Internet <URL: https://web.archive.org/web/20100603060630/http://www.hannibalcarbide.com/catalog.php>.*

Notification of the First Office Action in Chinese Patent Application No. 201180056763.2, dated Jan. 12, 2015.

Igetalloy Cutting Tool, ('07 -'08 General Catalogue) issued by Sumitomo Electric Hardmetal Co., p. L4, Coated Sumiboron Series (Oct. 2006).

Pobol et al., "Investigation of contact phenomena at cubic boron nitride-filler metal interface during electron beam brazing," Diamond and Related Materials, vol. 6, pp. 1067-1070 (1997).

International Search Report in International Patent Application No. PCT/JP2011/076888 dated Jan. 31, 2012.

Notification of the Second Office Action in Chinese Patent Application No. 201180056763.2, dated Sep. 2, 2015.

* cited by examiner

JOINED PRODUCT

TECHNICAL FIELD

The present invention relates to a joined product and specifically to a joined product suitable for a cutting tool.

BACKGROUND ART

Conventionally, a cutting tool having a tip with a material of large hardness brazed and thus joined thereto, as represented by a cubic boron nitride (cBN) cutting tool, has been produced and utilized for cutting special steel and other various types of cutting.

Specifically, for example, a tool having cemented carbide and cBN brazed and thus joined together is produced and sold (e.g., IGETALLOY Cutting Tool ('07-'08 General Catalogue) issued by Sumitomo Electric Hardmetal Co., October, 2006, p. L4, Coated SUMIBORON Series (Non Patent Document 1)). Alternatively, a joined product formed by joining PCD (sintered diamond) or cBN and ceramics, cermet or cemented carbide by brazing has been proposed (e.g., Japanese Patent Laying-Open No. 2002-036008 (Patent Document 1) and Japanese Patent No. 3549424 (Japanese Patent Laying-Open No. 11-320218 (Patent Document 2)). In addition, a cutting tool formed by joining cemented carbide or cermet and high-speed steel or the like by brazing with a Cu brazing filler has also been proposed (e.g., Japanese Patent Laying-Open No. 11-294058 (Patent Document 3)).

In recent years, inter alia, a cutting tool having cemented carbide and cBN joined together attracts attention in particular.

CITATION LIST

Patent Documents

PTD 1: Japanese Patent Laying-Open No. 2002-036008
PTD 2: Japanese Patent No. 3549424 (Japanese Patent Laying-Open No. 11-320218)
PTD 3: Japanese Patent Laying-Open No. 11-294058

Non Patent Document

NPD 1: IGETALLOY Cutting Tool ('07-'08 General Catalogue) issued by Sumitomo Electric Hardmetal Co., October, 2006, p. L4, Coated SUMIBORON Series

SUMMARY OF INVENTION

Technical Problem

However, it cannot be said that the joined product obtained by the above-mentioned conventional method has sufficiently large joint strength, and there has been a need for a joined product having larger joint strength, a joined product having cemented carbide and cBN firmly joined together, in particular.

Solution to Problem

To address the above issue, the present inventors have conducted a variety of experiments and diligently studied, and as a result found that generally, when Ti employed for a binder phase component for a cemented carbide sintered compact and a cBN sintered compact is contained in a joining material, then, in joining, Ti diffuses as a chemical element into the cemented carbide sintered compact and the cBN sintered compact and the compacts are firmly joined together, i.e., a joined product of large joint strength can be obtained.

Furthermore, it has been found that in this joint a reaction product of Ti and the nitrogen component of the cBN sintered compact, or a TiN compound layer, is produced at an interface between the joining material and the cBN sintered compact and that its thickness has a relationship with joint strength.

More specifically, heating for longer periods of time and containing Ti in larger amounts increase the TiN compound layer in thickness, and accordingly, in synergy with the TiN compound layer's excellent wettability for the cBN sintered compact, provide larger joint strength. However, when the TiN compound layer exceeds a thickness, the TiN compound layer's brittleness will have a large effect on joint strength, and if the TiN compound layer is formed excessively thick, more specifically, if a TiN compound layer having a thickness exceeding 300 nanometers (nm) is produced, the TiN compound layer easily fractures and cannot provide large joint strength. 100 nm or smaller is more preferable as it helps to provide large joint strength. Furthermore, the TiN compound may be granular crystal, columnar crystal, amorphous or in any crystalline state.

In contrast, it has been found that when the heating is done for a short period of time or Ti is introduced in a small amount, and accordingly, the TiN compound layer is excessively small in thickness, more specifically, when a TiN compound layer below 10 nm is produced, Ti insufficiently diffuses as a chemical element into the material to be joined and the TiN compound layer is not produced throughout a joint surface and thus tends to be produced over a reduced area, and thus cannot provide large joint strength. Note that the TiN compound layer may have a component other than Ti and N in a small amount. Such a component may include a chemical element that configures cBN and cemented carbide, and a chemical element that configures the joining material.

The present invention is based on the above findings, and it is a joined product with a cemented carbide sintered compact serving as a first material to be joined and a cBN sintered compact serving as a second material to be joined, wherein: the first material to be joined and the second material to be joined are joined together via a joining material disposed therebetween and containing titanium (Ti); and a titanium nitride (TiN) compound layer having a thickness of 10-300 nm is produced at an interface between the second material to be joined and the joining material.

The present invention can provide a joined product that has large joint strength between a cemented carbide sintered compact and a cBN sintered compact, as described above, and accordingly, can provide a cutting tool or the like of large joint strength.

As set forth above, the present invention provides a titanium nitride (TiN) compound layer that also includes a compound containing a chemical element other than Ti and N in a small amount falling within a range that does not depart from the gist of the present invention.

While the joining is done by heating, the cBN sintered compact is vulnerable to heat and decomposable at a high temperature, and accordingly, the cBN sintered compact is thermally degradable in a short period of time. Accordingly, preferably, the heating is performed for a short period of time.

A specific preferable heating means is resistance heating with conduction provided for a period of time within one minute, more preferably within 30 seconds, and in doing so, the first material to be joined or the cemented carbide sintered compact preferably has a temperature of approximately 1000-1300° C.

A joining material having a melting point equal to or lower than 1000° C. is preferable as it can prevent the cBN sintered compact from degrading in quality and also facilitate controlling the TiN compound layer's thickness to fall within a prescribed range.

If the joining material has a melting point equal to or higher than 1000° C., then, obtaining a TiN compound layer having a prescribed thickness requires heating for a longer period of time or at higher temperature. However, heating for a longer period of time easily causes degradation of cBN in quality and heating at higher temperature may result in a TiN compound layer having an excessively large thickness and also deform the cemented carbide sintered compact or the like.

Preferably, the heating is done while compression is provided in both a longitudinal direction and a lateral direction.

By compressing in both of the longitudinal and lateral directions, the cBN sintered compact can be joined at a position fixed relative to the cemented carbide base material and can thus be positioned precisely. This, as compared with compressing in one direction, allows the joining to be followed by grinding by a reduced amount, and furthermore, the cBN sintered compact to be moved and ground by an amount designed to be a minimally required amount, which allows a cBN sintered compact of a smaller size to be used and expensive cBN sintered compact to be used in a reduced amount.

Furthermore, compressing in the longitudinal and lateral directions with a controlled load is preferable since such can facilitate controlling a joining layer's thickness at bottom and back surfaces to a prescribed thickness ratio. Furthermore, the material to be joined and the joining material can contact each other over an increased area without depending solely on wettability, and accordingly, they can contact each other over the increased area in a short period of time, which is preferable. No or inappropriate compression in the lateral direction disadvantageously facilitates forming a gap mainly at the back surface, and a gap equal to or larger than 0.5 mm in width contributes to reduced joint strength, in particular. Furthermore, even if no gap is formed, failing to provide compression facilitates leaving bubbles in the joining layer and active chemical element diffusion by compression cannot be expected. Furthermore, if heated for a short period of time, insufficient wettability prevents the joining material from sufficiently spreading between the materials to be joined, and as a result the materials tend to be joined over a reduced area, resulting in reduced joint strength.

Furthermore, resistance heating while applying an excessively small compressive load on the cemented carbide base material results in increased contact resistance between the cemented carbide sintered compact and an electrode, and there is a possibility that there may be no current passing or a current may be discharged or a similar problem may arise. When resistance heating is performed, a pressure of 0.1-200 MPa is preferably applied.

A tool obtained by joining to the cemented carbide the cBN sintered compact including a metal binder such as cobalt (Co) and/or a sintered compact having a high cBN content exceeding 70% as a material to be joined has had such a problem that when the joining is done by heating for a long period of time at 1000° C. or higher, the cBN sintered compact cracks, which makes satisfactory joining difficult.

It is believed that this is because there is a significantly large difference between the coefficient of thermal expansion of cBN and that of the metal binder, and when they are heated at 1000° C. or higher the metal binder has a large volumetric expansion and the cBN sintered compact cracks, and if the cBN sintered compact has a cBN content exceeding 70% it has a coefficient of thermal expansion having a large difference from that of the cemented carbide that serves as a base material, and after they are joined when they are cooled the cBN sintered compact would crack. In addition, this is also probably because the metal binder in the cBN sintered compact forms a liquid phase at 1000° C. or higher and the cBN sintered compact cracks.

In order to prevent such degradation in quality of the cBN sintered compact, it is preferable to devise arrangement of the cBN sintered compact and the joining material as well as a conduction method such that the cemented carbide sintered compact generates heat more preferentially than the cBN sintered compact during resistance heating.

Specifically, this includes, for example, using different materials for an electrode that is in contact with the cBN sintered compact and an electrode that is in contact with the cemented carbide sintered compact. The electrodes formed of different materials allow different amounts of currents to pass through the sintered compacts, respectively, to control each sintered compact's heat generation. In addition, the cBN sintered compact may be indirectly heated by more intensively resistance-heating the cemented carbide sintered compact than the cBN sintered compact.

By thus devising a conduction path, the cemented carbide sintered compact can be heated more preferentially than the cBN sintered compact, which is preferable. While the cBN sintered compact is no longer heated at high temperature more than required, a vicinity of the joining material can be heated at high temperature in a short period of time and firm joint can thus be achieved, and furthermore, the cBN sintered compact's features such as large hardness can sufficiently be exploited without inviting degradation of the cBN sintered compact in quality, such as thermal degradation, decomposition, cracking and the like.

Furthermore in the present invention the joining material preferably includes one or two or more selected from zirconium (Zr), cobalt (Co), nickel (Ni), silver (Ag), and copper (Cu).

In the present invention a joined product having larger joint strength can be obtained when the joining material is formed of an alloy including Ti, as discussed above, and in addition thereto, Co and Ni generally used as a binder phase component of the cemented carbide sintered compact and the cBN sintered compact, or Ag, Cu and Zr exhibiting excellent wettability with respect to the cBN sintered compact.

Such a joining material can include, for example, an Ag—Ti alloy, a Cu—Ti alloy, a Ni—Ti alloy, a Co—Ti alloy and a solid solution thereof, e.g., a Cu—Ti—Zr alloy, an Ag—Cu—Ti alloy, a Cu—Ni—Ti alloy, a Cu—Ni—Zr—Ti alloy and the like, and furthermore, an intermetallic compound thereof and the like, for example. Note that it may also contain other components that are included in the cemented carbide base material or the cBN, e.g., W, Cr, Ta, Nb, or the like, in a small amount. For example it may contain a Cu—Cr—Al—Ti alloy or the like.

The intermetallic compound may be originally included in the joining material. In addition, a chemical element that configures the intermetallic compound may be included in the joining material in a different state, and the intermetallic compound may be reactively formed after the joining. When the intermetallic compound is reactively formed, the heat of the reaction can be used for the joining, and thus, the reactive formation of the intermetallic compound is more effective for the joining.

Furthermore preferably in the present invention when the joining material is configured of titanium (Ti), zirconium (Zr), copper (Cu) and nickel (Ni) and contains Ti, Zr and Cu at ratios, respectively, represented in total as x vol % and Ni at a ratio represented as (100-x) vol %, the joining material contains Ti at a ratio of (0.1-0.4)x vol %, Zr at a ratio of (0.1-0.4)x vol %, and Cu at a ratio of (0.3-0.7)x vol %.

As set forth above, Ni is used as a binder phase component of the cemented carbide sintered compact and the cBN sintered compact and Cu and Zr exhibit excellent wettability with respect to the cBN sintered compact, and using a joining material containing these materials can provide a joined product of larger joint strength.

The present inventors have conducted a variety of experiments and found that when the joining material contains Ti, Zr and Cu at ratios, respectively, represented in total as x vol % and Ni at a ratio represented as (100-x) vol %, and furthermore, the joining material contains Cu, Zr and Ti at the above indicated ratios, respectively, the joining material is helped to have a satisfactory meting point and satisfactory wettability and allows stronger joint. Note that, in the above description, for example the notation "(0.1-0.4)x vol %" indicates that that content ratio (vol %) falls within a range of 0.1x to 0.4x.

Furthermore in the present invention preferably the joining material contains nickel (Ni) at a ratio equal to or smaller than 70 vol %.

As set forth above, the joining material that contains Ni used as a binder phase component of the cemented carbide sintered compact and the cBN sintered compact allows a joined product to have larger joint strength. However, when the joining material contains Ni at a ratio exceeding 70 vol %, the joining material will contain Ti in a relatively reduced amount and it will be difficult to obtain a TiN compound layer having an appropriate thickness as set forth above, which is unpreferable.

Furthermore in the present invention preferably the second material to be joined is joined to the first material to be joined at a bottom surface of the second material to be joined and at a back surface of the second material to be joined, and a joining layer at the back surface is larger in thickness than the joining layer at the bottom surface.

In cutting, intermittently cutting in particular, when a cutting tool contacts a workpiece, the tool receives an impact at the cutting edge, and the joining material that is a relatively soft layer effectively alleviates the impact. However, it has a side closer to the bottom surface prone to plastic deformation by the load and heat caused by the cutting, resulting in reduced chipping resistance and reduced working accuracy. The present inventors have found that appropriate compression in the longitudinal and lateral directions allows the joining layer to be smaller in thickness at the bottom surface than at the back surface to provide a joined product having large chipping resistance while maintaining working accuracy.

Generally the first material to be joined, or the cemented carbide sintered compact, is formed by press-forming, and accordingly, it has an inclined draft angle at a surface thereof opposite to the back surface of the second material to be joined.

Accordingly, when the first material to be joined and the second material to be joined are matched, a gap tends to result at the back surface, and if the joining material (or an inserted material) simply runs around from the bottom surface, a void (or gap) results and sufficient joint may not be obtained. Accordingly, preferably, the joining material is also used for joining with the back surface.

The present invention provides a joining layer larger in thickness at the back surface than at the bottom surface. This contributes to reduction of void (or gap), and hence sufficient joint strength.

Furthermore in the present invention preferably when the joining layer at the back surface has a thickness represented as a and the joining layer at the bottom surface has a thickness represented as b, b is 1-50 µm and 1<a/b<20 is satisfied.

The present inventors have found that the above joined product that has a joining layer closer to the bottom surface that has a thickness of 1-50 µm, more preferably 1-20 µm, which is smaller than that for a general, vacuum-brazed joined product, is less prone to plastic deformation and can easily maintain high working accuracy. Furthermore, the present inventors have found that a ratio of thickness a of the joining layer at the back surface to thickness b of the joining layer at the bottom surface, i.e., a/b, that is controlled within a prescribed range allows a resultant joined product to maintain high working accuracy and also have excellent chipping resistance.

More specifically, if the joining layer at the bottom surface has an excessively large thickness, it is prone to plastic deformation during a cutting test. Furthermore, if a/b is excessively small, i.e., if the thickness of the joining layer at the back surface is excessively smaller than that of the joining layer at the bottom surface, the joining layer cannot internally alleviate impact and it is difficult to obtain effectively improved chipping resistance. In contrast, the present inventors have found that if a/b is excessively large, i.e., if the thickness of the joining layer at the back surface is excessively larger than that of the joining layer at the bottom surface, then even if it appears that there is no gap in appearance there is an increased possibility that the joining layer internally has a gap resulting in reduced joint strength. 1<a/b<20 is preferable and 2<a/b<15 is more preferable. In this regard, it is preferable that the joining layer at the back surface has a thickness of 5-200 µm, more preferably 5-100 µm since such allows the joining layer to be less prone to have an internal gap. It has been difficult for a conventional brazing method to control the joining layer's thickness at the back and bottom surfaces, as done in the present invention.

As described above, in the present invention, there can be provided a tool that can make full use of the properties of the cBN sintered compact such as large hardness with large joint strength without inviting degradation in quality (thermal degradation, decomposition, cracking, and the like) of the cBN sintered compact that is a high-pressure-stable-type material. In particular, the tool of the present invention is preferable as it can be suitably provided as a tool such as a wear resistant tool, a mine and civil engineering tool, and a cutting tool.

Advantageous Effects of Invention

The present invention can provide a joined product that has larger joint strength than that obtained in a conventional method, and a cutting tool or the like of large joint strength.

DESCRIPTION OF EMBODIMENTS

Hereinafter reference will be made to the drawings to describe the present invention in embodiment.

1. Configuration of Joined Product

Figure 1:
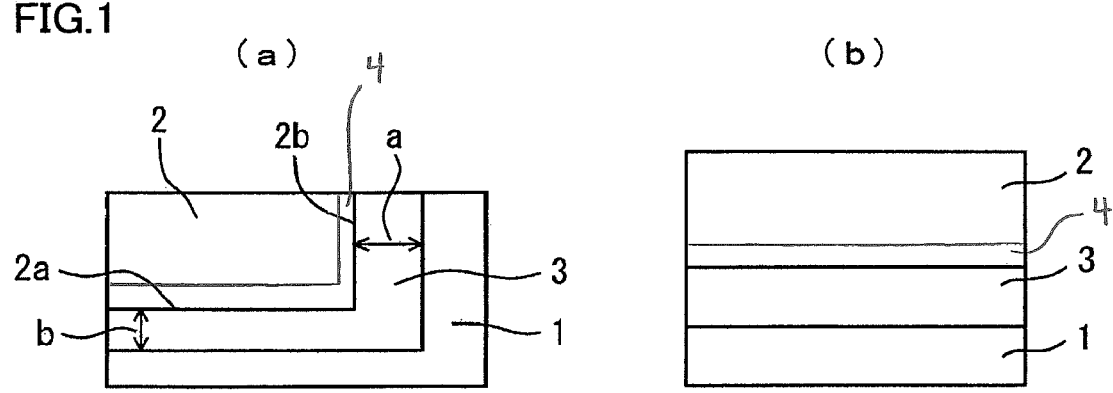
FIGS. 1(a) and 1(b) are schematic side and plan views, respectively, of a joined product in an embodiment of the present invention.

FIGS. 1(a) and 1(b) are schematic side and plan views, respectively, of a joined product in an embodiment of the present invention, in FIG. 1, the joined product includes a first material to be joined 1 that is formed of a cemented carbide sintered compact, a second material to be joined 2 that is formed of a cBN sintered compact, and a joining material 3 that is disposed between first material to be joined 1 and second material to be joined 2 and contains Ti, and a TiN compound layer 4 having a thickness of 10-300 nm is produced at an interface between second material to be joined 2 and joining material 3.

Method for Joining by Resistance Heating and Compression

Figure 2:
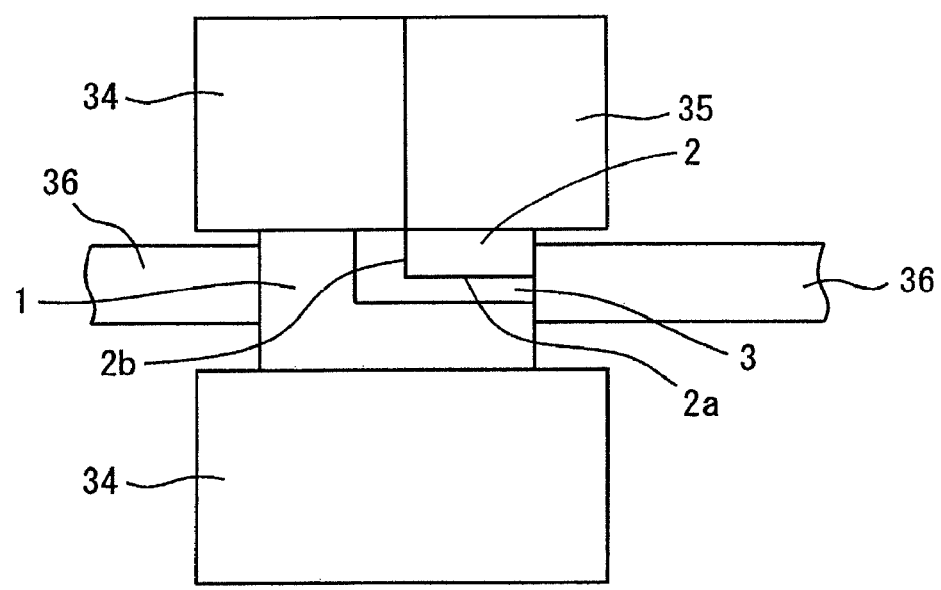
FIG. 2 is a conceptual view for illustrating one manner of conduction in joining by resistance heating and compression.

First, a method for joining by resistance heating and compression will be described with reference to FIG. 2. FIG. 2 is a conceptual view for illustrating one manner of conduction in joining by resistance heating and compression. FIG. 2 includes an electrode 34, a split electrode 35, and a horizontally compressing material 36 formed of alumina and the like.

In FIG. 2, split electrode 35 is in contact with second material to be joined 2, and electrode 34 is in contact with first material to be joined 1. By using different materials for electrode 34 and split electrode 35, they can be changed in electrical conductivity and thermal conductivity. In addition, different currents can be applied to first material to be joined 1 and second material to be joined 2, respectively, and the materials can be extremely changed in temperature.

This allows first material to be joined 1 to generate heat more preferentially than second material to be joined 2, and can prevent second material to be joined 2 that is vulnerable to heat and thermally degradable in a short period of time (or the cBN sintered compact) from thermally degrading.

Furthermore, by compressing each electrode independently, the pressure applied to first material to be joined 1 and that applied to second material to be joined 2 can be controlled with high precision. Accordingly, compressing in an optimal balance with a compressive load in the lateral direction applied to second material to be joined 2 by horizontally compressing material 36 to allow first material to be joined 1 to be of optimal contact resistance allows joining material 3 (or a joining layer) to have an optimal thickness.

Conditions for Conduction

Conditions for conduction are determined as appropriate depending on the materials and the like of first material to be joined 1, second material to be joined 2 and joining material 3 that are used. It is preferable that the conduction is done for a period of time within one minute, within approximately 30 seconds, in particular, to avoid inviting deformation or melting of the materials of first material to be joined 1 and second material to be joined 2 as well as bulking of particles in a portion other than a portion in a vicinity of joining material 3.

Form/Manner of Joining Material

As a form/manner of joining material 3 for joining by resistance heating and compression, a method for coating a surface of first material to be joined 1 and/or second material to be joined 2 by a plating method or a physical vapor deposition method can be employed, in addition to a method for applying the joining material in the form of powder, foil or paste onto a surface of first material to be joined 1 and/or that of second material to be joined 2. The method for coating first material to be joined 1 and second material to be joined 2 by the plating method or the physical vapor deposition method is especially preferable for stabilization of joint strength because the method facilitates handling of materials to be joined 1 and 2 after materials to be joined 1 and 2 are coated with joining material 3 and is thus advantageous in automation of the joining step, and also facilitates controlling the thickness of the coating.

Compression

Resistance heating and compression render joining material 3 deformable, enhance adhesion between joining material 3 and materials to be joined 1 and 2, and facilitate chemical element diffusion. Consequently, dramatically enhanced joint strength can be achieved. In particular, when the joined product of the present invention is applied to a cutting tool, a cutting insert for example, a joint surface of first material to be joined 1, which serves as a base material, and second material to be joined 2 points in two directions or the vertical and horizontal directions, and accordingly, it is necessary to tightly join first material to be joined 1 and second material to be joined 2 in both directions. In that case, compressing in two directions, as set forth above, is preferable.

Excessively small compressive load is inappropriate because it causes an increased contact resistance between the electrodes and first and second materials to be joined 1 and 2 and a current cannot be passed or electrical discharge occurs. Excessively large compressive load is also inappropriate because it deforms the cemented carbide sintered compact. In the case of the present invention, 0.1 MPa to 200 MPa is appropriate for material to be joined 1, whereas 0.01-50 MPa is appropriate for material to be joined 2.

Atmosphere

First material to be joined 1, second material to be joined 2 and joining material 3 all contain metal, and accordingly, the materials are joined together preferably in a vacuum, an inert gas, or a reducing atmosphere. Although the vacuum is not particularly limited in degree, it is desirable that the degree of the vacuum is higher than 13.3 Pa (0.1 Torr). The inert gas can include argon, helium, nitrogen, or a gaseous mixture thereof. The reducing atmosphere can include a gaseous atmosphere in which a small proportion of gaseous hydrogen is mixed with the above inert gas, or can be provided by placing heated graphite in a vicinity of joining material 3, or the like.

Manner of Current that is Passed Through

As a manner of a current that is passed through, a direct current and an alternating current can both be used if the current allows first material to be joined 1, second material to be joined 2 and joining material 3 to be heated to an appropriate temperature. In particular, a pulsed direct current can change a peak current value and a ratio between ON and OFF of the pulse, and accordingly, allows a joint interface to be instantaneously heated and an overall temperature control range of first and second materials to be joined 1 and 2 to be widened. The pulsed direct current is thus effective in the joining.

Setting Thickness of Joining Material

The thickness of joining material 3 will be described hereinafter with reference to FIG. 1. Joining material 3 can be set in thickness to have a thickness a closer to a back surface 2b to be larger than a thickness h closer to a bottom surface 2a, preferably $1 < a/b < 20$, to achieve large chipping resistance and also maintain high working accuracy, and furthermore, reduce void at the back surface, in which void easily forms, and thus provide constantly high joint strength.

EXAMPLES

1. Producing Joined Product

Each joining material 3 shown in Table 1 was used and each joining condition followed to produce joined products of Examples 1-23 and Comparative Examples 1-7.

(1) Thickness of TiN Compound Layer

See Table 1 (at the column of "thickness of compound layer").

(2) First Material to Be Joined 1 (identical throughout Examples and Comparative Examples)

Material: cemented carbide sintered compact having a portion counterbored (base metal)

Geometry: point-angle: 90°, inscribed circle: 12.7 mm, thickness: 4.76 mm, R: 0.8 mm (HS: SNGN120408)

(3) Second Material to Be Joined 2 (identical throughout Examples and Comparative Examples)

Material: cBN (insert) (cBN content: 90%)

Geometry: 2 mm×1 mm, and 1.2 mm in thickness (4) Joining material (composition and state), heating method, and joining conditions See Table 1. In Table 1, the column of "composition of joining material" indicates a composition of joining material 3 that has been joined and it is a result of an investigation in the EPMA method, and this composition matched that of joining material 3 that is a starting material. The first material to be joined and the second material to be joined are set such that the second material to be joined has a bottom surface of a range of 1 mm×1 mm as well as a back surface both in contact with the counterbore of the first material to be joined, and in that condition the materials are joined together. In Table 1, the column of "form/manner of joining material" indicates the joining material in various forms/manners. The term "powder" indicates that the joining material is powdery. The term "physical vapor deposition" indicates that the joining material is used through physical vapor deposition on the materials to be joined. The term "physical vapor deposition+ plating" indicates that the joining material is used through physical vapor deposition on one of the first and second materials to be joined and the joining material is used to plate the other of the first and second materials to be joined. The term "powder+plating" indicates that the joining material is used to plate the materials to be joined and is also used in the form of powder.

Note that in the heating method, "conduction" means joining by resistance heating and compression, and in the conditions for the joining, "heating time" indicates how long in time a pulsed direct current indicated in the column "current" is conducted. "Compressive load for cemented carbide base material" indicates pressure applied to the first material to be joined. "Compressive load for cBN" indicates pressure applied to the second material to be joined. "Compressive load in lateral direction" indicates pressure applied by the horizontally compressing material shown in FIG. 2. Furthermore, in the heating method, "vacuum furnace" indicates a heating method using a vacuum furnace and indicates heating at a base material temperature indicated in Table 1. Furthermore, in the heating method, "high frequency" indicates heating using a high frequency induction heating device.

2. Method of Measurement (1) Thickness of Joining Material

After polishing, a bottom surface joining material thickness (an average thickness of joining material 3 (or a joining layer) at an exposed surface thereof closer to the bottom surface of second material to be joined 2) and a back surface joining material thickness (an average thickness of joining material 3 (or the joining layer) at an exposed surface thereof closer to the back surface of second material to be joined 2) were measured through an observation with a microscope. The result is shown in Table 1. "Back surface/bottom surface thickness ratio" indicates a ratio of the back surface joining material thickness to the bottom surface joining material thickness (back surface joining material thickness/bottom surface joining material thickness).

(2) Thickness of TiN Compound Layer

After the joint interface was FIB-processed, an observation with TEM and a composition analysis with EDX and EELS were conducted to measure a TiN compound layer in thickness. The observation was done under magnification adjusted, as appropriate, depending on the TiN compound layer's thickness, and an average value in thickness within one field of view was obtained. The result is indicated in Table 1 (see the column of "thickness of compound layer").

(3) Measuring Base Material Temperature

Figure 3:
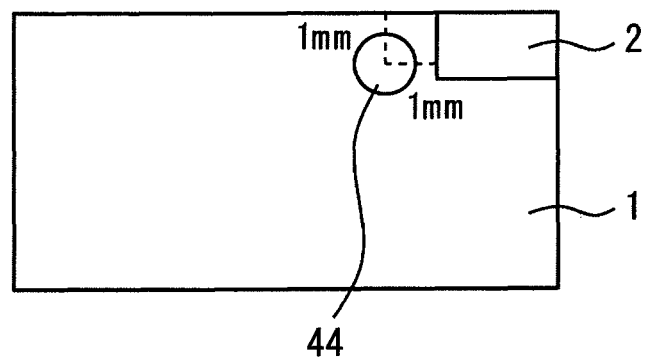
FIG. 3 is a side view for illustrating temperature measurement.

FIG. 3 is a schematic diagram for illustrating a method for measuring the base material's temperature. In FIG. 3, the joined product has first material to be joined 1 exposed to a laser spot 44.

First material to be joined 1 (or the cemented carbide sintered compact) in a vicinity of the counterbore was measured in temperature with a radiation thermometer. Specifically, as shown in FIG. 3, laser spot 44 (1 mm in diameter) was positioned to have a center on first material to be joined 1 (13 mm square×5 mm in thickness) at a position away by 1 mm from the upper surface of first material to be joined 1 and also away by 1 mm from the back surface of the counterbore, and was measured in temperature with the radiation thermometer. The measurement is shown in Table 1.

(4) Measuring Joint Strength

Figure 4:
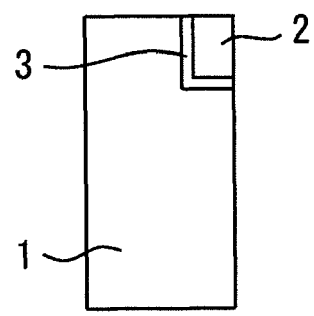
FIG. 4 is a side view for illustrating strength measurement.

FIG. 4 illustrates a method for measuring joint strength. While the joined product was compressed in a direction from the upper and lower sides of the sheet of the drawing, force perpendicular to the plane of the sheet of the drawing was applied to a portion of second material to be joined 2 that projected from first material to be joined 1 to impart shear force to joining material 3, and strength when it fractured was measured as joint strength. The measurement is shown in Table 1.

Note that, in Table 1, examples with no bottom surface joining material thickness or joint strength indicated indicate that the materials to be joined were not joined by the joining material.

3. Observation

After the joint strength measurement, Examples and Comparative Examples had their fractured surfaces observed with SEM-EDX. Furthermore, they also had their joint surfaces observed with TEM.

Example 3 had a fractured surface observed in SEM and EDX images and a joint surface observed in a TEM image and was subjected to an EELS analysis to reveal that, rather than a B rich layer, i.e., the TiN compound layer believed to be brittle, the cBN was internally fractured, and that large joint strength had been obtained. In contrast, Comparative Example 7 had a TiN compound layer having an excessively large thickness and fractured and it has been found that it was unable to provide large joint strength. The other Examples and the other Comparative Examples were similarly observed.

4. Assessment

It has been found from Table 1 that the joined product has joint strength varying with the TiN compound layer's thickness and it can have large joint strength when the layer has a thickness in a range of 10-300 nm. Note that Example 6 has a/b>20 and thus has void (or gap) at the back surface, and hence reduced joint strength. Furthermore, Examples 18-21 satisfy such a condition that when the joining material is configured of titanium (Ti), zirconium (Zr), copper (Cu) and nickel (Ni) and contains Ti, Zr and Cu at ratios, respectively, represented in total as x vol % and Ni at a ratio represented as (100-x) vol %, the joining material contains Ti at a ratio of (0.1-0.4)x vol %, Zr at a ratio of (0.1-0.4)x vol %, and Cu at a ratio of (0.3-0.7)x vol %

Furthermore, it has been found that Examples 2-4, i.e., Examples with heating done for 10-60 seconds, provided a TiN compound layer of appropriate thickness and were not observed to have the cBN thermally degraded, and that Example 3, i.e., an Example with heating done for 20 seconds, can provide a particularly large joint strength.

TABLE 1

| | | composition of joining material | form/manner of joining material | method for heating | conditions for joining | | | |
|---|---|---|---|---|---|---|---|---|
| | | | | | current (A) | heating time (s) | base material temperature (°C.) | compressive load for cemented carbide base material (MPa) |
| Comp. ex. | 1 | Ti—50Cu—25Zr | powder | conduction | 2100 | 3 | 700 | 1.5 |
| Comp. ex. | 2 | " | " | " | " | 6 | 900 | " |
| Ex. | 1 | " | " | " | " | 8 | 1000 | " |
| Ex. | 2 | " | " | " | " | 10 | " | " |
| Ex. | 3 | " | " | " | " | 20 | 1100 | " |
| Ex. | 22 | " | " | " | " | 40 | " | " |
| Ex. | 4 | " | " | " | " | 60 | 1200 | " |
| Ex. | 5 | " | " | " | " | 90 | 1300 | " |
| Comp. ex. | 3 | " | " | " | " | 120 | 1350 | " |
| Comp. ex. | 4 | " | " | " | 2000 | 600 | 1100 | " |
| Comp. ex. | 5 | " | " | vacuum furnace | — | 1800 | 900 | 0 |
| Ex. | 6 | " | " | conduction | 2100 | 20 | 1100 | 1.5 |
| Ex. | 7 | " | " | " | " | " | " | " |
| Ex. | 8 | " | " | " | " | " | " | " |
| Ex. | 9 | " | " | " | " | " | " | " |
| Ex. | 10 | " | " | " | " | " | " | " |
| Ex. | 11 | " | " | " | " | " | " | " |
| Ex. | 12 | " | " | " | " | " | " | " |
| Ex. | 13 | " | " | " | " | " | 1450 | 0.05 |
| Ex. | 14 | " | " | " | " | " | 1100 | 1.5 |
| Ex. | 15 | " | " | " | " | " | " | " |
| Ex. | 16 | " | " | high frequency | " | " | " | 0 |
| Ex. | 17 | Ti—30Co | " | conduction | " | " | 1200 | 1.5 |
| Ex. | 18 | Ti—25Ni—40Cu—15Zr | physical vapor deposition | " | " | " | 1100 | " |
| Ex. | 19 | " | physical vapor deposition + plating | " | " | " | " | " |
| Ex. | 20 | " | powder | plating | " | " | " | " | " |
| Ex. | 21 | Ti—70Ni—16Cu—7Zr | physical vapor deposition + plating | " | " | " | " | " |
| Comp. ex. | 6 | Ni | powder | " | " | " | " | " |
| Comp. ex. | 7 | Ti—50Cu—25Zr | powder | vacuum furnace | — | 1800 | 800 | 0 |
| Ex. | 23 | " | " | conduction | 2100 | 20 | 1100 | 1.5 |

| | | conditions for joining | | thickness of joining material at bottom surface (µm) | thickness of joining material at back surface (µm) | thickness of compound layer (nm) | back surface/ bottom surface thickness ratio | joint strength (MPa) |
|---|---|---|---|---|---|---|---|---|
| | | compressive load for cBN (MPa) | compressive load in lateral direction (MPa) | | | | | |
| Comp. ex. | 1 | 0.1 | 0.05 | — | — | — | — | — |
| Comp. ex. | 2 | " | " | 35 | 100 | 5 | 2.9 | 80 |
| Ex. | 1 | " | " | 30 | 70 | 10 | 2.3 | 470 |
| Ex. | 2 | " | " | 20 | 50 | 18 | 2.5 | 510 |
| Ex. | 3 | " | " | 12 | 25 | 60 | 2.1 | 560 |
| Ex. | 22 | " | " | 10 | 22 | 130 | 2.2 | 490 |
| Ex. | 4 | " | " | 10 | 20 | 250 | 2.0 | 430 |
| Ex. | 5 | " | " | 5 | 13 | 300 | 2.6 | 400 |
| Comp. ex. | 3 | " | " | 4 | 11 | 350 | 2.8 | 280 |
| Comp. ex. | 4 | " | " | 4 | 6 | 540 | 1.5 | 240 |
| Comp. ex. | 5 | 0 | 0 | 120 | 120 | 750 | 1.0 | 250 |
| Ex. | 6 | 0.1 | 0.005 | 12 | 280 | 59 | 23.3 | 390 |
| Ex. | 7 | " | 0.01 | 12 | 220 | 54 | 18.3 | 470 |
| Ex. | 8 | " | 0.02 | 12 | 55 | 60 | 4.6 | 510 |
| Ex. | 9 | " | 0.03 | 12 | 28 | 55 | 2.3 | 530 |
| Ex. | 10 | " | 0.1 | 12 | 14 | 57 | 1.2 | 530 |
| Ex. | 11 | " | 0.2 | 12 | 10 | 55 | 0.8 | 420 |
| Ex. | 12 | " | 0.5 | 65 | 12 | 63 | 0.2 | 390 |
| Ex. | 13 | " | 0.1 | 7 | 9 | 210 | 1.3 | 400 |
| Ex. | 14 | " | 0.01 | 20 | 250 | 40 | 12.5 | 380 |
| Ex. | 15 | 0.2 | 0.02 | 4 | 120 | 50 | 30.0 | 410 |

TABLE 1-continued

| | | | | | | | | |
|---|---|---|---|---|---|---|---|---|
| Ex. | 16 | 0 | 0 | 45 | 52 | 90 | 1.2 | 420 |
| Ex. | 17 | 0.1 | 0.05 | 38 | 56 | 45 | 1.5 | 490 |
| Ex. | 18 | " | " | 20 | 34 | 75 | 1.7 | 580 |
| Ex. | 19 | " | " | 25 | 30 | 59 | 1.2 | 510 |
| Ex. | 20 | " | " | 25 | 38 | 65 | 1.5 | 550 |
| Ex. | 21 | " | " | 25 | 45 | 22 | 1.8 | 330 |
| Comp. ex. | 6 | " | " | — | — | — | — | — |
| Comp. ex. | 7 | 0 | 0 | 130 | 130 | 370 | 1.00 | 270 |
| Ex. | 23 | 0.1 | 0 | 12 | 280 | 59 | 23.3 | 320 |

Note that in Table 1 at the column of "composition of joining material", Cu, Zr, Co, Ni are each preceded by a numerical value, which indicates each metal's volumetric percentage. Note that Ti is not preceded by any numerical value, which indicates that Ti is a balance.

5. Cutting Test

The joined products produced under the conditions obtained in Examples 6-12 were used to conduct a cutting test. The cutting was done under the following conditions:

Geometry of tool: CNGA120408
Cutting rate: 150 m/min
Cut: 0.1 mm
Feed rate: 0.1 mm/rev
Cutting time: 60 mins
Material to be cut: SCN415 having axially extending four grooves (dry type)

The result is shown in Table 2.

TABLE 2

| | thickness of joining material at bottom surface (μm) | thickness of joining material at back surface (μm) | back surface/bottom surface thickness ratio | amount worn |
|---|---|---|---|---|
| Ex. 6 | 12 | 280 | 23.3 | disjoint |
| Ex. 7 | 12 | 220 | 18.3 | 0.28 |
| Ex. 8 | 12 | 55 | 4.6 | 0.24 |
| Ex. 9 | 12 | 28 | 2.3 | 0.22 |
| Ex. 10 | 12 | 14 | 1.2 | 0.22 |
| Ex. 11 | 12 | 10 | 0.8 | chipped |
| Ex. 12 | 65 | 12 | 0.2 | chipped |

From Table 2, it has been found that joined products each with a joining layer having a thickness of 1-50 μm at the bottom surface and a back surface/bottom surface thickness ratio (the joining layer's thickness at the back surface/the joining layer's thickness at the bottom surface) exceeding 1 and smaller than 20, or Examples 7-10, were worn by an amount equal to or smaller than 0.28 mm and had excellent wear resistance. In contrast, a joined product with a back surface/bottom surface thickness ratio exceeding 20, or Example 6, had a joining layer with an excessively large thickness at the back surface and accordingly had insufficient joint strength resulting in disjoint. Furthermore, a joined product with a joining layer excessively smaller in thickness at the back surface than at the bottom surface with a back surface/bottom surface thickness ratio below 1, or Example 11, was chipped by the cutting load. Furthermore, a joined product with a joining layer excessively larger in thickness at the bottom surface than at the back surface with a back surface/bottom surface thickness ratio below 1, or Example 12, had the joining layer softened during the cutting, and the joined product was chipped. Example 10 was not severely chipped, however, after the cutting, its cutting edge was closely observed and found to have small chippage as compared with Examples 7-9.

While the present invention has been described based on embodiment, the present invention is not limited thereto. Various modifications can be made thereto within a scope that is the same as and equivalent to that of the present invention.

REFERENCE SIGNS LIST

1: first material to be joined; 2: second material to be joined; 2a: bottom surface; 2b: back surface; 3: joining material; 34: electrode; 35: split electrode; 36: horizontally compressing material; 44: laser spot; a: thickness of joining layer at back surface; b: thickness of joining layer at bottom surface.

The invention claimed is:

1. A joined product with a cemented carbide sintered compact serving as a first material to be joined and a cBN sintered compact serving as a second material to be joined, wherein: said first material to be joined and said second material to be joined are joined together via a joining material disposed therebetween and containing titanium (Ti); and a titanium nitride (TiN) compound layer having a thickness of 10-300 nm is produced at an interface between said second material to be joined and said joining material so that said titanium nitride (TiN) compound layer is located between said second material to be joined and said joining material.

2. The joined product according to claim 1, wherein said joining material includes one or two or more selected from zirconium (Zr), cobalt (Co), nickel (Ni), silver (Ag), and copper (Cu).

3. The joined product according to claim 2, wherein when said joining material is configured of titanium (Ti), zirconium (Zr), copper (Cu) and nickel (Ni) and contains Ti, Zr and Cu at ratios, respectively, represented in total as x vol % and Ni at a ratio represented as (100-x) vol %, said joining material contains Ti at a ratio of (0.1-0.4)x vol %, Zr at a ratio of (0.1-0.4)x vol %, and Cu at a ratio of (0.3-0.7)x vol %.

4. The joined product according to claim 2, wherein said joining material contains nickel (Ni) at a ratio equal to or smaller than 70 vol %.

5. The joined product according to claim 1, wherein said second material to be joined is joined to said first material to be joined at a bottom surface of said second material to be joined and at a back surface of said second material to be joined, and said joining material at said back surface is larger in thickness than said joining material at said bottom surface.

6. The joined product according to claim 5, wherein when said joining material at said back surface has a thickness represented as a and said joining material at said bottom surface has a thickness represented as b, b is 1-50 μm and 1<a/b<20 is satisfied.

* * * * *